US008014027B1

(12) United States Patent
Kulkarni et al.

(10) Patent No.: US 8,014,027 B1
(45) Date of Patent: Sep. 6, 2011

(54) AUTOMATIC SELECTION OF COLOR CONVERSION METHOD USING IMAGE STATE INFORMATION

(75) Inventors: Manish S. Kulkarni, Saratoga, CA (US); Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 906 days.

(21) Appl. No.: 11/689,342

(22) Filed: Mar. 21, 2007

(51) Int. Cl.
G06F 15/00 (2006.01)
(52) U.S. Cl. .................. 358/1.9; 358/3.01; 358/3.21
(58) Field of Classification Search ............... 358/1.9, 358/3.01, 521, 3.21
See application file for complete search history.

(56) References Cited

U.S. PATENT DOCUMENTS

| | | | |
|---|---|---|---|
| 6,435,657 B1 * | 8/2002 | Couwenhoven et al. | 347/43 |
| 7,468,820 B2 * | 12/2008 | Ng et al. | 358/518 |
| 2004/0246526 A1 * | 12/2004 | Ishigami et al. | 358/3.01 |
| 2005/0185837 A1 * | 8/2005 | Takano et al. | 382/162 |
| 2005/0195415 A1 * | 9/2005 | De Baer | 358/1.9 |
| 2006/0007460 A1 * | 1/2006 | Bogdanowicz et al. | 358/1.9 |
| 2006/0280360 A1 * | 12/2006 | Holub | 382/162 |
| 2007/0046958 A1 * | 3/2007 | Hoof et al. | 358/1.9 |
| 2007/0076260 A1 * | 4/2007 | Upton | 358/3.21 |
| 2008/0123948 A1 * | 5/2008 | De Baer | 382/167 |

OTHER PUBLICATIONS

Manish S. Kulkarni, Rendering and Un-Rendering Using Profile Replacement, U.S. Appl. No. 12/187,226, filed Aug. 6, 2008, 27 pages, to be published by USPTO.
Jack Holm, et al, "International Color Consortium Official Ballot" Ballot #200701, Proposal Version 1.2, Jun. 16, 2006, 9 pages.
Jack Holm, et al., "ICC Votable Proposal Submission Colorimetric Intent Image State Tag Proposal", Proposal Version 1.2, Jun. 16, 2006, 8 pages.
International Color Consortium Making Color Seamless Between Devices and Documents, Introduction to the ICC profile format, http://www.color.org/iccprofile.html; Feb. 26, 2007, 8 pages.
International Color Consortium White Paper #5, Level: Introductory, Glossary of Terms, 25 pages, Dec. 2004.
International Color Consortium Specification ICC.1:2004-10 (Profile Version 4.2.0.0), Image technology colour management—Architecture, profile format, and data structure, [Revision of ICC.1:2003-09], May 22, 2006, 112 pages.
Garret M. Johnson, et al., "Rendering HDR Images", Munsell Color Science Laboratory, Chester F. Carlson Center for Imaging Science, Rochester Institute of Technology, Rochester, New York, USA, 7 pages, 2003.
FAQ-HDR images for Photography, Sep. 7, 2006, http://www.hdrsoft.com/resources/dri.html, 12 pages.
Florian Kainz, "A Proposal for OpenEXR Color Management", Industrial Light and Magic, Aug. 5, 2004, 9 pages.
Color Management: Color Space Conversion, Sep. 7, 2006, http://www.cambridgeincolour.com/tutorials.color-space-conversion.html, 8 pages.

* cited by examiner

Primary Examiner — Chan S Park
Assistant Examiner — Allen H Nguyen
(74) Attorney, Agent, or Firm — Fish & Richardson P.C.

(57) ABSTRACT

In general, one aspect of the subject matter described in this specification can be embodied in a method that includes obtaining an image and a corresponding color profile including state information for the image in relation to the color profile, the state information selected from a group including a scene-referred state and an output-referred state; selecting, automatically in response to identification of the state information, a rendering intent for the image, based on the state information and a current task in an imaging workflow, from a group including relative colorimetric rendering intent, perceptual rendering intent and absolute colorimetric rendering intent; converting, automatically in response to the selecting, the image to a new color space based on the color profile and the selected rendering intent; and making the converted image available for processing and output.

23 Claims, 8 Drawing Sheets

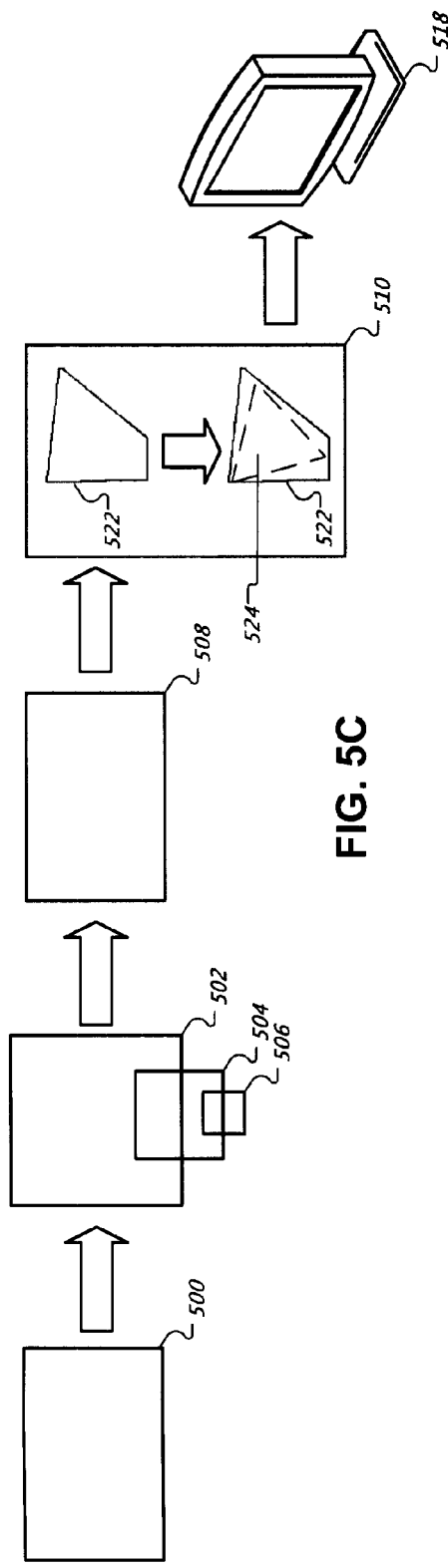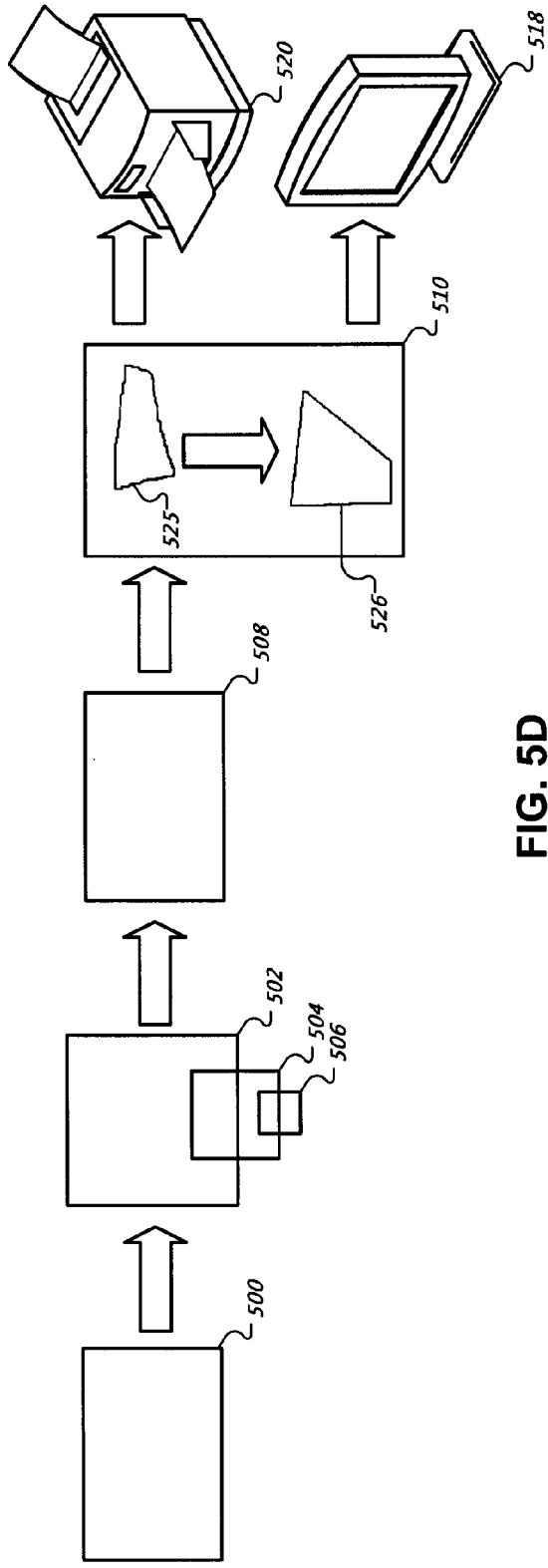
FIG. 5C
FIG. 5D

US 8,014,027 B1

AUTOMATIC SELECTION OF COLOR CONVERSION METHOD USING IMAGE STATE INFORMATION

BACKGROUND

The present disclosure relates to color conversion techniques and color management systems and software.

Devices that are capable of representing image data (e.g., monitors, printers, scanners, cameras) often have significant variations in color gamut, the range of colors producible by the device. To accommodate this range in device gamuts, a variety of color spaces, and color management systems and techniques have been developed. Color management enables different color space values to be mapped from one device's gamut to another's using color profiles, which define how color information is transformed into or out of a standard reference space called a profile connection space.

Using color management, a human's perception of color from one device representation to another can be kept close to constant, despite the variation in color capabilities of different devices. To assist in color management, the Commission Internationale de L'Eclairage (CIE) has defined various color spaces that are device-independent and encompass the full gamut of human vision, and can thus be used as profile connection spaces. Typical profile connection spaces in color management systems include CIEXYZ and CIELAB. LAB space is a color space having a luminance channel, L, and opponent color channels, A (green↔red) and B (blue↔ yellow).

A color profile defines how to transform color information from one color space to another, such as from a device-dependent color space into a profile connection space, or the reverse. Many color profiles also conform to a defined color profile architecture, which provides flexibility in their use. For example, the International Color Consortium (ICC) provides a defined color profile architecture commonly used in many color management systems. ICC profiles have been developed for many different color spaces.

In addition, some ICC members have recently proposed the inclusion of image state information in ICC profiles, which will allow the specification of the image state of a given image's data as being scene-referred or output-referred. Scene-referred image data is image data that represents estimates of the color-space coordinates of the elements of a scene. Output-referred image data is image data that represents the color-space coordinates of the elements of an image that has undergone color rendering appropriate for a specified real or virtual output device and viewing conditions.

SUMMARY

This specification describes technologies relating to automatic selection of a color conversion method using image state information.

In general, an aspect of the subject matter described in this specification can be embodied in a method that includes obtaining an image and a corresponding color profile including state information for the image in relation to the color profile, the state information selected from a group including a scene-referred state and an output-referred state; selecting, automatically in response to identification of the state information, a rendering intent for the image, based on the state information and a current task in an imaging workflow, from a group including relative colorimetric rendering intent, perceptual rendering intent and absolute colorimetric rendering intent; converting, automatically in response to the selecting, the image to a new color space based on the color profile and the selected rendering intent; and making the converted image available for processing and output. After any further appropriate processing, in view of the current workflow, the converted image can be output to an appropriate output device.

An aspect of the subject matter described in this specification can be embodied in a method that includes obtaining an image, a corresponding color profile and state information for the image, the state information selected from a group including a scene-referred state and an output-referred state; selecting, automatically in response to identification of the state information, between a relative colorimetric rendering intent and a perceptual rendering intent, based on a preference setting, when the state information indicates the output-referred state and a current task in an imaging workflow includes outputting the image to an output device; converting, automatically in response to the selecting, the image to a new color space based on the color profile and using the selected rendering intent when the state information indicates the output-referred state and the current task in the imaging workflow includes outputting the image to the output device; and making the converted image available for output via the output device. After any further appropriate processing, in view of the current workflow, the converted image can be output to an appropriate output device.

The output device can include a display device, and the converting can include transforming data in the image to over-range RGB data using the color profile, the absolute colorimetric rendering intent, and an RGB profile; transforming the over-range RGB data to non-over-range RGB data using toning; and transforming the non-over-range RGB data to output data using the RGB profile, a display device profile of the display device, and a relative colorimetric rendering intent. The output device can include a printing device, and the converting can include transforming data in the image to over-range RGB data using the color profile, the absolute colorimetric rendering intent, and an RGB profile; transforming the over-range RGB data to non-over-range RGB data using toning; and transforming the non-over-range RGB data to output data using the RGB profile, a printing device profile of the printing device, and an additional rendering intent selected from a group including a relative colorimetric rendering intent and a perceptual rendering intent based on a preference setting.

The current task in the imaging workflow can include displaying the image for scene preview, and the output device can include a display device. The image can include a working space image, the current task in the imaging workflow can include displaying the working space image for compositing, and the output device can include a display device. Obtaining the image can include receiving the image with the color profile embedded therein, and the color profile can include the state information.

The image can include a working space image, the current task in the imaging workflow can include displaying the working space image for display output preview, and the converting can include converting to XYZ space using the color profile and the absolute colorimetric rendering intent; converting from the XYZ space to a first display device color space using a first display device profile and a relative colorimetric rendering intent; and converting from the first display device color space to a second display device color space using a second display device profile and a preview rendering intent defined by a proofing setting (which rendering intent can default to a relative colorimetric rendering intent).

The image can include a working space image, the current task in the imaging workflow can include displaying the working space image for printing output preview, and the converting can include converting to XYZ space using the color profile and the absolute colorimetric rendering intent; converting from the XYZ space to a printing device color space using a printing device profile and an additional rendering intent selected from a group including a relative colorimetric rendering intent and a perceptual rendering intent based on a preference setting; and converting from the printing device color space to a display device color space using a display device profile and a preview rendering intent defined by a proofing setting (which rendering intent can default to a relative colorimetric rendering intent).

An aspect of the subject matter described in this specification can be embodied in a method that includes obtaining an image, a corresponding color profile and state information for the image, the state information selected from a group including a scene-referred state and an output-referred state; selecting, automatically in response to identification of the state information, between a relative colorimetric rendering intent and a perceptual rendering intent, based on a preference setting, when the state information indicates the output-referred state and a current task in an imaging workflow includes outputting the image to an output device; converting, automatically in response to the selecting, the image to a new color space based on the color profile and using the selected rendering intent when the state information indicates the output-referred state and the current task in the imaging workflow includes outputting the image to the output device; and making the converted image available for output via the output device. After any further appropriate processing, in view of the current workflow, the converted image can be output to an appropriate output device.

The output device can include a display device. The output device can include a printing device. Obtaining the image can include receiving the image with the color profile embedded therein, and the color profile can include the state information. In addition, obtaining the image can include receiving the image and the color profile, the color profile being tagged as scene-referred but also specifying the perceptual rendering intent, the color profile thereby indicating the preference setting to select the perceptual rendering intent, and the state information indicating the output-referred state despite the color profile being tagged as scene-referred.

An aspect of the subject matter described in this specification can be embodied in a method that includes obtaining an image, a corresponding color profile and state information for the image, the state information selected from a group including a scene-referred state and an output-referred state; selecting, automatically in response to identification of the state information, a rendering intent when a current task in an imaging workflow includes compositing the image with a different image in a working color space, the selected rendering intent including an absolute colorimetric rendering intent when the state information indicates the scene-referred state, and the selected rendering intent includes a relative colorimetric rendering intent when the state information indicates the output-referred state; converting, automatically in response to the selecting, the image to the working color space based on the color profile and using the selected rendering intent when the imaging workflow includes compositing the image with the different image in the working color space; and making the converted image available for processing in the working color space. After any further appropriate processing, in view of the current workflow, the converted image can be output to an appropriate output device. In addition, obtaining the image can include receiving the image with the color profile embedded therein, and the color profile can include the state information.

Other embodiments of the above aspects can also be implemented in corresponding systems and computer program products. Various computer program products can be encoded on computer-readable media and be operable to cause data processing apparatus to perform the operations described. In addition, various systems can include an output device and one or more computers operable to interact with the output device and to perform the operations described. Such systems can include personal computers, client-server systems and mobile device systems, such as those described further below.

Particular embodiments of the subject matter described in this specification can be implemented to realize one or more of the following advantages. Color conversion methods can be selected automatically by imaging software, without user intervention, based on image state information and a current workflow. When using imaging software, the number of user interface settings, and the amount of detailed knowledge of color management techniques that a user need understand and work with can be reduced. Thus, the experience of users of imaging software can be improved. Moreover, the user interface can still provide functionality for overriding the automated color conversion techniques for more experienced users, and thus sophisticated imaging software can be made more readily accessible to a wider range of users.

The subject matter described in this specification can be implemented in one or more color management modules (CMMs). Such CMM(s) can also be imported into various software tools and applications for use in achieving the automatic selection of color conversion methods as described herein.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIGS. 5A, 5B, 5C, and 5D are block diagrams showing examples of image conversion.

Like reference numbers and designations in the various drawings indicate like elements.

DETAILED DESCRIPTION

Figure 1:
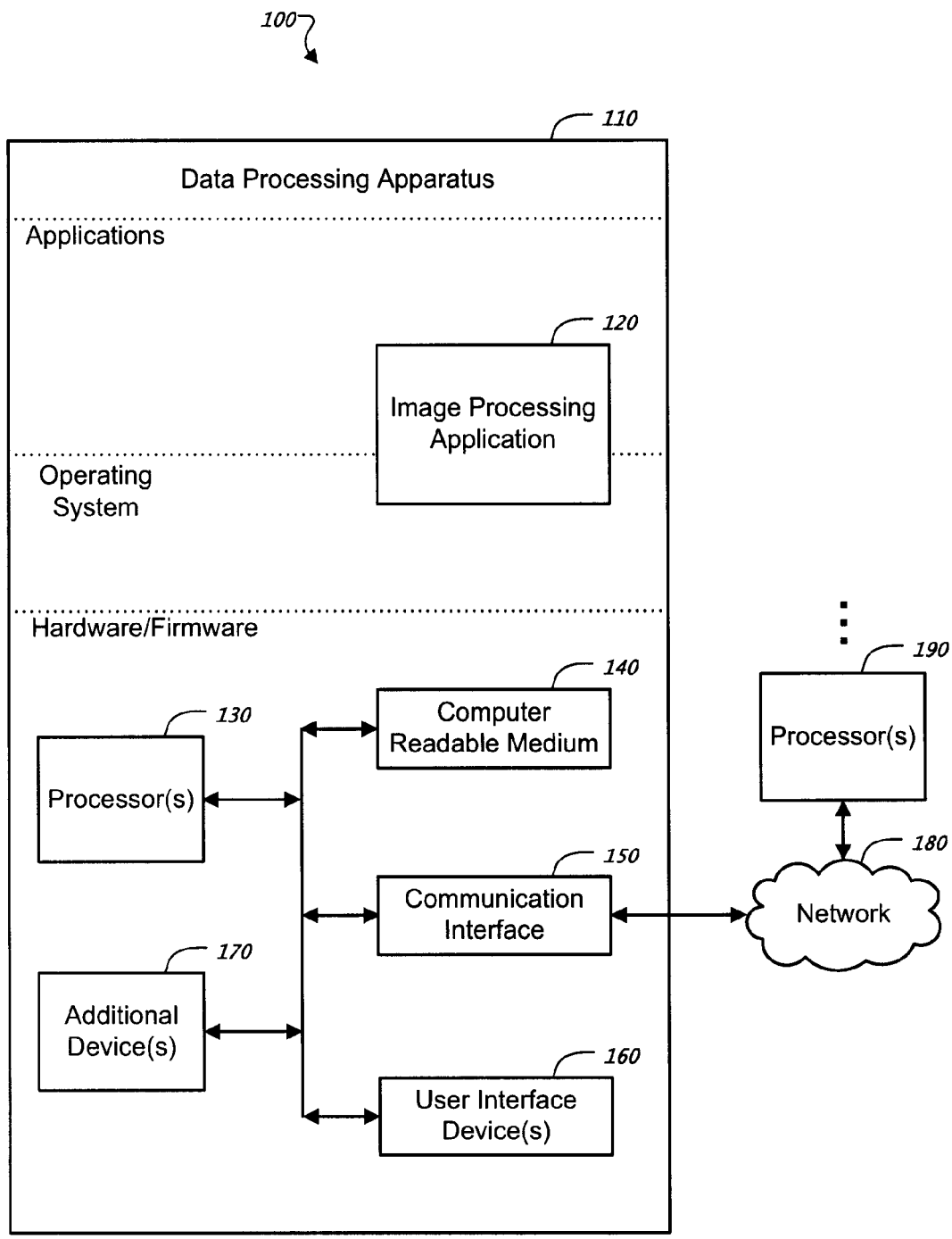
FIG. 1 shows an example system configured to automatically select an appropriate color conversion method based on image state information.

FIG. 1 shows an example system configured to automatically select an appropriate color conversion method based on image state information. A data processing apparatus 110 can include hardware/firmware, an operating system and one or more applications, including an image processing application 120. As used herein, an application refers to a computer program that the user perceives as a distinct computer tool used for a defined purpose. An application 120 can be built entirely into the operating system (OS) of the data processing apparatus 110, or an application 120 can have different components located in different locations (e.g., one portion in the OS or kernel mode, one portion in the user mode, and one portion in a remote server), and an application 120 can be built on a runtime library serving as a software platform of the apparatus 110. Moreover, an application 120 can be a graphical user interface application (e.g., a Web browser) that connects to one or more processors 190 (e.g., one or more Web servers) over a network 180 and provides the computer tool as a network service.

The image processing application 120 can include visual effects software (e.g., Adobe® After Effects® software, available from Adobe Systems Incorporated of San Jose, Calif.), image editing software (e.g., Adobe® Photoshop® software, available from Adobe Systems Incorporated of San Jose, Calif.), and video editing software (e.g., Adobe® Premiere® software, available from Adobe Systems Incorporated of San Jose, Calif.). Thus, the image processing application 120 can operate on digital images from many different sources. Moreover, a digital image (which for brevity will simply be referred to as an image) does not necessarily correspond to a file. An image may be stored in a portion of a file that holds other images, in a single file dedicated to the image in question, or in multiple coordinated files. In addition, as used herein, an image can include multiple images; thus, "an image" includes video imagery in addition to still images.

The data processing apparatus 110 includes one or more processors 130 and at least one computer-readable medium 140. The at least one computer-readable medium 140 can include a random access memory (RAM) a program memory (for example, a writable read-only memory (ROM) such as a flash ROM), a hard drive, and a removable disk drive (e.g., a floppy disk, compact disk (CD), or digital versatile disk (DVD) drive). All such computer-readable media can be suitable for storing executable or interpretable computer programs, including programs embodying aspects of the subject matter described in this specification. In addition, the data processing apparatus 110 can include a hard drive controller, a video controller, and an input/output (I/O) controller coupled by a system bus. The apparatus 110 can be preprogrammed, in ROM, for example, or it can be programmed (and reprogrammed) by loading a program from another source (for example, from a floppy disk, a CD-ROM, DVD, or another computer).

The data processing apparatus 110 can also include one or more input/output (I/O) interface devices, such as a communication interface 150, one or more user interface devices 160, and one or more additional devices 170. The I/O interface devices can be coupled with one or more I/O controllers in the apparatus 110 through one or more I/O buses, and the I/O interface devices can receive and transmit data (e.g., stills, pictures, movies, and animations for importing into a composition) in analog or digital form over communication links such as a serial link, local area network, wireless link, and parallel link. The user interface device(s) 160 can include display screen(s), keyboard(s) (e.g., a custom video editing keyboard), mouse, stylus, or any combination thereof. Moreover, the data processing apparatus 110 can itself be considered a user interface device (e.g., when the image processing application 120 is delivered as a Web service).

The additional device(s) 170 can include various devices used for video and film editing. This can include a video controller coupled to a video recorder (which can be used for storing and importing video footage and for writing final output), a sound system, and a battery backup. Moreover, the subject matter described in this specification can be used in conjunction with any digital print engine or marking engine, display monitor, or other raster output device capable of producing color or gray scale pixels on paper, film, display screen, or other output medium.

Once programmed in accordance with the description below, the data processing apparatus 110 is operable to automatically select a color conversion method and convert an image to a new color space based on image state information.

Figure 2:
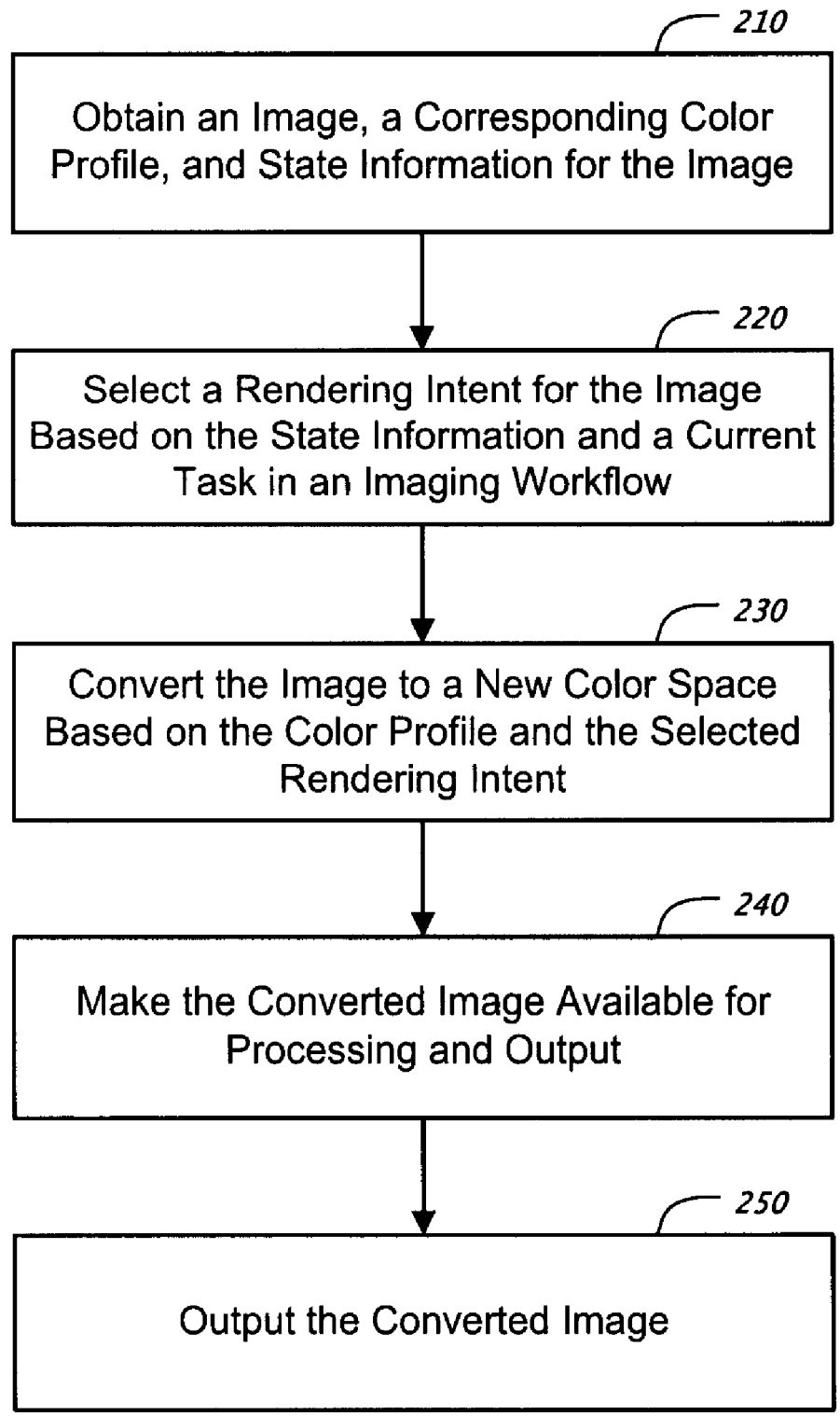
FIG. 2 shows an example process of automatically converting an image based on image state information.

FIG. 2 shows an example process of automatically converting an image based on image state information. An image and a corresponding color profile including state information for the image in relation to the color profile are obtained 210. The state information has been selected from a group including a scene-referred state and an output-referred state (e.g., a tag in a color profile that specifies scene-referred or output-referred image data). The scene-referred state indicates that applying the color profile to the image results in scene-referred image data, and the output-referred state indicates that applying the color profile to the image results in output-referred image data. Scene-referred image data is image data that represents estimates of the color-space coordinates of the elements of a scene. Output-referred image data is image data that represents the color-space coordinates of the elements of an image that has undergone color rendering appropriate for a specified real or virtual output device and viewing conditions. In general, scene-referred data is prepared so as to be proportional to relative luminance among objects in a scene depicted in the image, and output-referred data is prepared such that the data is generally non-linear in relation to scene luminance and facilitates presentation via an output device.

Obtaining the image can involve automatically seeking out and loading the image from a given source, such as a storage medium or a network resource, or receiving the image in response to an event. For example, a user can employ the user interface of an application to locate and direct opening of the image. Moreover, the color profile can be associated with the image and separately loaded along with it, or the color profile can be embedded within the image itself.

In any event, a check can be made to determine if the color profile includes state information for the image, and in response to identification of the state information, a rendering intent can be automatically selected 220 for the image. This selection is automatic in that the selection is performed without user intervention. The selection can be based on the state information and a current task in an imaging workflow, such as described further below. Moreover, the selection of rendering intent can be made from a group including relative colorimetric rendering intent, perceptual rendering intent and absolute colorimetric rendering intent.

Furthermore, in response to the selection of rendering intent, the image can then be converted 230 automatically to a new color space based on the color profile and the selected rendering intent, and the converted image can be made available 240 for processing and output. The new color space generally depends on the workflow and the corresponding processing and output to be expected. For example, the new color space can be a working color space or an output device color space. After any further appropriate processing, in view of the current workflow, the converted image can be output 250 to an appropriate output device.

Figure 3A:
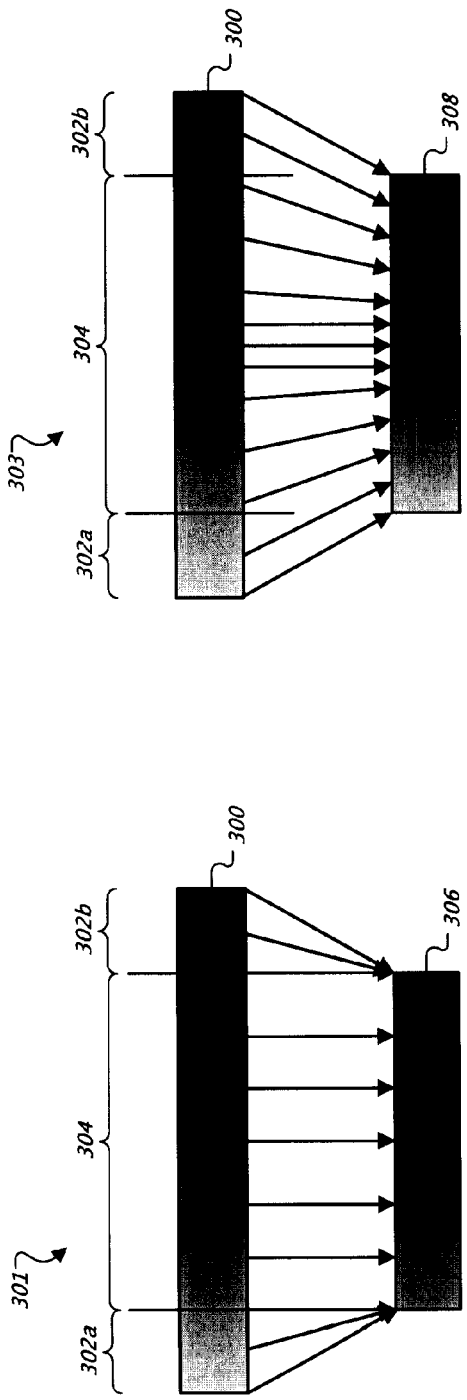
FIGS. 3A and 3B are block diagrams showing general examples of an absolute colorimetric rendering intent, a relative colorimetric rendering intent and a perceptual rendering intent.
Figure 3B:
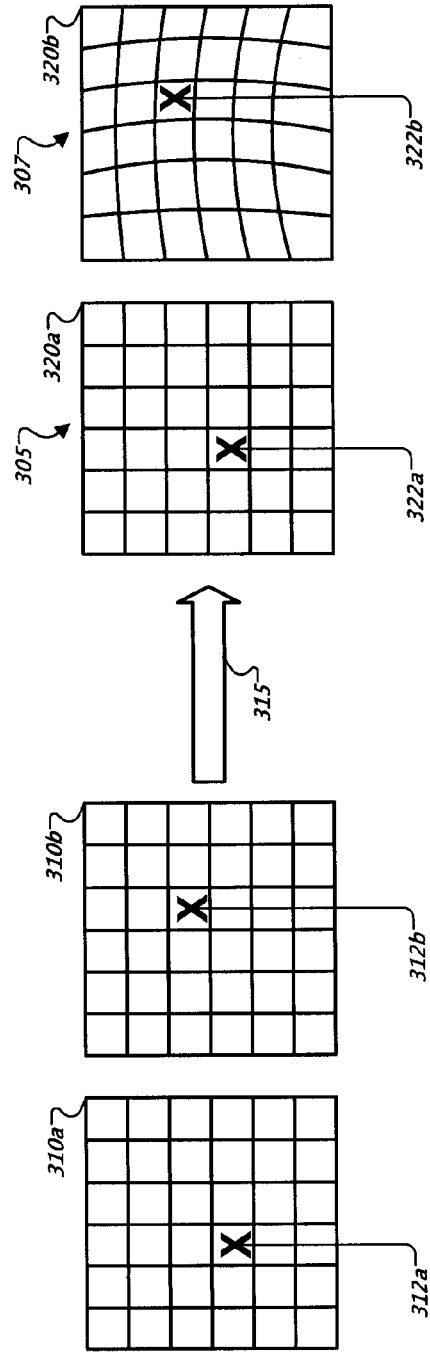

FIGS. 3A and 3B are block diagrams showing general examples of an absolute colorimetric rendering intent, a relative colorimetric rendering intent and a perceptual rendering intent. The absolute colorimetric rendering intent, relative colorimetric rendering intent and perceptual rendering intent can be used to convert colors between color spaces for various devices. The conversion generally attempts to find a best match between the different color spaces. Color spaces can be converted using a color management module (CMM). Moreover, the CMM can be included with an application. For example, image processing applications described above in reference to FIG. 1 may include an Adobe Color Engine (ACE), developed by Adobe Systems Incorporated of San Jose, Calif. However, in some implementations, the CMM can be imported into an application. For example, Adobe® CMM, available from Adobe Systems Incorporated of San Jose, Calif., can be imported into other applications that can use third party CMMs.

FIG. 3A illustrates color space conversions using a relative colorimetric rendering intent 301 and a perceptual rendering intent 303. Color range 300 describes a gamut that can be displayed by a first output device. However, as illustrated by reduced color ranges 306 and 308, not all devices are capable of displaying the same range of colors. For illustrative purposes, gamut 300 is divided into three regions. Regions 302a and 302b represent out-of-gamut colors for color range 306 and color range 308. Region 304 represents colors that are in-gamut colors for color range 306 and color range 308.

As illustrated by the relative colorimetric rendering intent 301, the out-of-gamut colors 302a and 302b are compressed to form the lower and upper regions of the color range 306, respectively. The range of colors 304 is typically uncompressed. This can yield a color range 306 that is generally represented by the relationships in the in-gamut colors and incorporates few of the relationships in the out-of-gamut colors. In other words, the in-gamut colors can be substantially maintained while the out-of-gamut colors can be clipped.

In contrast, as illustrated by perceptual rendering intent 303, the out-of-gamut colors 302a, 302b, and the in-gamut colors 304 are compressed to form the entire color range 308.

The central colors (i.e., the colors nearest the middle of the color range 308) are more precisely remapped than the colors on the edges. This yields a color range that is generally represented by the relationships across the entirety of the original gamut, but where the central colors are typically better approximated than the colors at the edges of the original gamut.

Each approach has its own advantages. For example, if an image is defined by many out-of-gamut colors, or if the out-of-gamut colors represent important information, it may be advantageous to use a perceptual rendering intent that maintains the relationships of the entire original gamut. However, if an image is defined by many in-gamut colors, or if the in-gamut colors represent important information, it may be advantageous to use a relative colorimetric rendering intent to maintain a substantially similar relationship between in-gamut colors.

An absolute colorimetric rendering intent typically maps an original gamut to a new gamut in a substantially similar fashion to a relative colorimetric rendering intent. In other words, a gamut mapped using an absolute colorimetric rendering intent will typically include uncompressed relationships of in-gamut colors, and compressed relationships of out-of-gamut colors.

FIG. 3B illustrates example white point mappings using an absolute colorimetric rendering intent conversion 305 and a relative colorimetric rendering intent conversion 307. A white point is a location in a color space that defines the purest white color. For example, in color spaces 310a and 310b (which have the same gamut, but different white points), the white point is defined as the point 312a and 312b, respectively. In certain color spaces, the white point is not a pure white color. For example, if an RGB display had a color range of [0-230] in the red, green and blue channels, the white point exists at (230, 230, 230) which does not define a pure white point. Instead, the white point (230, 230, 230) includes a grey tint.

The white point is typically remapped during gamut translation by a CMM, but the absolute colorimetric rendering intent preserves colors exactly. For example, as illustrated by absolute colorimetric rendering intent conversion 305, when an original color space 310a is sent to the CMM 315, for translation into a new color space 310b, the use of absolute colorimetric rendering intent results in color space 320a. As shown, the absolute colorimetric rendering intent conversion 305 uses substantially similar colors as the color space 310a, and also preserves the white point. White point 322a of the new color space is essentially the same as white point 312a of the original color space 310a. In other words, the absolute colorimetric rendering intent conversion 305 uses substantially similar colors in both color spaces, without considering the changes in the white point. As illustrated by the example relative colorimetric rendering intent conversion 307, the relative colorimetric rendering intent shifts the colors to align the old white point 312a with the new white point 312b to yield white point 322b. Moreover, the relative colorimetric rendering intent attempts to maintain the colors' relative positions during the color shift.

The previous examples illustrate color space transitions using 2-dimensional color spaces. In a 3-dimensional space, images can include shadows and highlights that are typically generated by a light source. The differences between a relative colorimetric rendering intent and a perceptual rendering intent in a 3D color space are generally similar to the example illustrated in FIG. 3A. In other words, shadows and highlights that are out-of-gamut are clipped in a relative colorimetric rendering intent and are compressed in a perceptual rendering intent. Similarly, the differences between relative colorimetric rendering intent and absolute colorimetric rendering intent in a 3D color space are generally similar to the example illustrated in FIG. 3B. In other words, an absolute colorimetric rendering intent preserves the white point by using the original colors of the color space while a relative colorimetric rendering intent skews the colors to align the new white point with the original white point.

Figure 4:
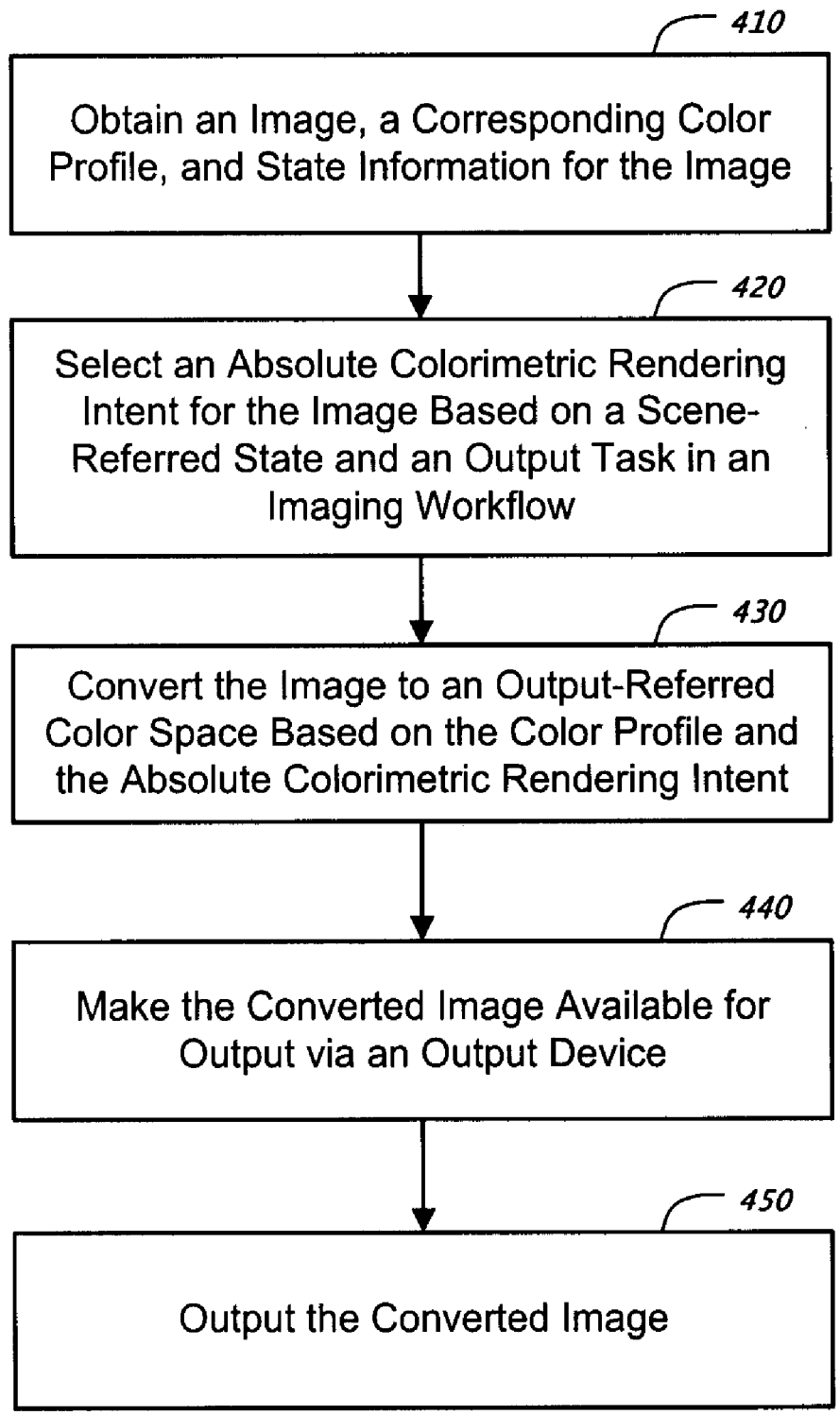
FIG. 4 shows an example process of automatically converting a scene-referred image for output.

FIG. 4 shows an example process of automatically converting a scene-referred image for output. An image and a corresponding color profile including state information for the image in relation to the color profile are obtained 410. The state information has been selected from a group including a scene-referred state and an output-referred state. The scene-referred state indicates that applying the color profile to the image results in scene-referred image data, and the output-referred state indicates that applying the color profile to the image results in output-referred image data. Scene-referred image data is image data that represents estimates of the color-space coordinates of the elements of a scene. Output-referred image data is image data that represents the color-space coordinates of the elements of an image that has undergone color rendering appropriate for a specified real or virtual output device and viewing conditions. In general, scene-referred data is prepared so as to be proportional to relative luminance among objects in a scene depicted in the image, and output-referred data is prepared such that the data is generally non-linear in relation to luminance and facilitates presentation via an output device.

Obtaining the image can involve automatically seeking out and loading the image from a given source, such as a storage medium or a network resource, or receiving the image in response to an event. For example, a user can employ the user interface of an application to locate and direct opening of the image. Moreover, the color profile can be associated with the image and separately loaded along with it, or the color profile can be embedded within the image itself.

In any event, a check can be made to determine if the color profile includes state information for the image. An additional check can also be made to determine a current task in an imaging workflow. For example, the state information can indicate a scene-referred state and the imaging workflow can be performing an image output task to an output device (e.g., output devices described below in reference to FIGS. 5A to 5D). In response to identification of the state information and imaging workflow task, an absolute colorimetric rendering intent can be automatically selected 420 for the image. This selection is automatic in that the selection is performed without user intervention. Moreover, as illustrated by the previous example, the selection can be made based on the state information and the imaging workflow, or some combination thereof.

Furthermore, in response to the selection of the absolute colorimetric rendering intent, the image can then be converted 430 automatically to a new color space based on the color profile and the absolute colorimetric rendering intent. For example, the image can be converted from a source color space to the XYZ color space using the absolute colorimetric rendering intent, and then converted from the XYZ color space to an appropriate monitor color space using the relative colorimetric rendering intent. Moreover, the converted image can be made available 440 for output via an output device. The new color space generally depends on the workflow and the corresponding output to be expected. For example, if a first output device includes a display which uses a Red-Green-Blue (RGB) color space, the image may be converted to an RGB color space when output to the display. Additionally, if a second output device includes a printer that prints in the Cyan-Magenta-Yellow-Black (CMYK) color space, the image may be converted to a CMYK color space when output to the printer. Moreover, the conversion can be done more than once or between devices. For example, the color space can be converted a first time to RGB for output on the display device, and a second time from RGB to CMYK to output on the printer device. After any further appropriate processing, in view of the current workflow, the converted image can be output 450 to an appropriate output device.

FIGS. 5A, 5B, 5C, and 5D are block diagrams showing examples of image conversion. Input device(s) (e.g., scanner, digital camera, video camera, etc.) 500 can be used generate image data 502. The input device 500 can be local or remote, and can be connected to a personal computer or other output device via a network, wireless link, cable, or system bus. Moreover, the input device 500 can be integrated into a composite device, such as a printer/scanner that includes a processor or a portable digital assistant (PDA). The input device 500 can be used in a variety of imaging workflows. For example, the input device 500 can provide image data 502 for preview (e.g., proofing), compositing, editing, and the like. In addition, it should be noted that image state information can be specified for both scene-referred and output-referred situations (e.g., an image can have two associated color profiles, a first with a scene-referred image state tag and a second with an output-referred image state tag), in which case, the rendering intent is still selected based on the current workflow (e.g., use the scene-referred case when converting to a working space for compositing or when displaying for scene preview).

Image data 502 can exist in many different file formats. For example, Bitmaps (BMP, developed by Microsoft Corporation of Redmond, Wash.), Graphics Interchange Format (GIF, developed by CompuServe of Columbus, Ohio), Tagged Image File Format (TIFF, developed by Adobe Systems Incorporated of San Jose, Calif.), Joint Photographic Experts Group (JPEG, developed by Joint Photographic Experts Group), Extended Dynamic Range Image File Format (OpenEXR, developed by Industrial Light and Magic of San Francisco, Calif.), etc. Furthermore, the image data 502 can represent various color spaces. Example color spaces include, but are not limited to, RGB, CMYK, Adobe RGB, CIE LAB, and the like.

Typically, the image data 502 is maintained in a low dynamic range (LDR) or a high dynamic range (HDR). Dynamic range is a ratio used to specify the difference between the highest and lowest values that can be represented and is typically measured in luminance (i.e., candelas per square meter). The range of luminance values that the human eye can distinguish is large. For example, the luminance value of starlight is 0.001 cd/m$^2$, while the luminance value of a sunlit room can be 100,000 cd/m$^2$.

A dynamic range for a scene can be defined by measuring the darkest and brightest parts of a scene. For example, it is possible for a scene to have a dynamic range of 100,000:1. A camera's dynamic range can be defined by measuring the intensity that just saturates the camera to the intensity that just lifts the camera response one standard deviation above camera noise. For example, commonly available digital cameras have a dynamic range of about 1000:1. A display device's dynamic range can be defined by measuring maximum and minimum intensities emitted from the display device.

LDR image data is typically represented using 8-bit, 16-bit, and 24-bit image data. HDR image data is typically represented by 32-bit floating point values. HDR image data is also frequently scene-referred data. In other words, the data is prepared so as to be proportional to relative luminance among objects in a scene depicted in the image. HDR image data often remains proportional to light values (i.e., they use linear values). When displaying HDR image data using the relative colorimetric rendering intent, the entire dynamic range of the image is mapped to the dynamic range of the display, which can cause the image to look extremely dark. When displaying HDR image data using the absolute colorimetric rendering intent, without HDR toning, the range of the image that is outside the dynamic range of the display is often clipped, but the image looks reasonable. In addition, when HDR toning is applied, the clipping can be reduced or eliminated.

Toning (i.e., tone mapping) maps scene luminance from a high dynamic range to the output device luminance of a lower dynamic range. Examples of tone mapping are global operators and local operators. Global operators process all the pixels in an image in a uniform way. Typically, global operators map the pixel values based on an intensity value, regardless of spatial position. For example, the filter $L=Y/(Y+1)$ can map the luminance values of Y in the range of $[0, \infty)$ to output values in the range of $[0, 1)$; however, this filter does not access nearby neighbors to influence the luminance value. Conversely, local operators process the pixels by accessing nearby pixels to determine an appropriate scaling. For example, a box filter can be used to determine a pixel's luminance value by comparing values of the pixel's nearby neighbors. One or more appropriate filters (e.g., Retinex) can be used, and various toning options can be provided (e.g., highlight compression, exposure & gamma, equalize histogram, local adaptation). Global operators are typically faster, while local operators can yield better results.

An example file format useful for HDR images is OpenEXR. OpenEXR is an open source file format developed by Industrial Light and Magic of San Francisco, Calif. OpenEXR image can use lossless or lossy data compression. Lossless and lossy data compressions are techniques used to compress and decompress data. Lossless compression typically creates an exact representation of the original data after decompression. Examples of lossless compression used by OpenEXR include PIZ, Zip, and RLE (run length encoding) based compression. Lossy compression, however, typically creates an approximation of the original data after decompression. In some implementations, the approximation can still be substantially similar to the original as it relates to human perception. For example, MP3 lossy compression for audio data removes audio that is typically less audible by humans. In other words, the original data may be different, but the change in data may be imperceptible to humans. Examples of lossy compression used by OpenEXR include PXR24 and B44 based compression.

Furthermore, the OpenEXR format can include an arbitrary number of image channels. Image channels define various color properties that are channel dependant. For example, a red color channel defines a redness of a pixel, while an alpha channel defines opacity of a pixel. For example, an alpha of 0 is transparent, an alpha of 1 is opaque and combinations there between are partially transparent and partially opaque. Example image channels include, but are not limited to, red, green, blue, alpha, luminance, sub-sampled chroma, depth, surface normal, motion vectors, etc. OpenEXR can represent the different channels using half precision (i.e., 16-bit floating point), full precision (i.e., 32-bit floating point), or 32-bit integers.

Moreover, the OpenEXR format can implement scan-line, tiled, and multi-resolution images. In a scan-line image, the pixel data is organized into horizontal rows (i.e., scan lines). For example, image data that is defined by rectangle coordinates (xmin, ymin), (xmax, ymax) includes ymax−ymin+1 scan lines. Tiled images can be subdivided into a collection of smaller rectangles (i.e., tiles). Each tile includes a certain number of pixels, generally denoted as px and py. For example, image data that is defined by rectangle coordinates (xmin, ymin), (xmax, ymax) contains ceiling(w/px) by ceiling(h/py) tiles, where w and h are the width and height of the data window and are defined as w=xmax−xmin+1 h=ymax−ymin+1. Typically, the upper left corner of the upper left tile is aligned with the upper left corner of the image data (e.g., at (xmin, ymin)).

A single tiled OpenEXR file may contain multiple versions (i.e., levels) of the same image, each level having a different resolution. In some implementations, a file can contain only one level of resolution. A one level file is equivalent to a scan-line-based file; the only difference is that pixels are accessed by tile rather than by scan line. In other implementations, the file contains multiple versions of the image. Each successive level is half the resolution of the previous level in both dimensions. The lowest-resolution level typically contains a single pixel. For example, if the first level, with full resolution, contains 16×8 pixels, then the file contains four more levels with 8×4, 4×2, 2×1, and 1×1 pixels respectively. In yet other implementations, the levels include all combinations of reducing the resolution of the first level by powers of two independently in both dimensions. For example, if the first level contains 4×4 pixels, then the file contains eight additional levels with dimensions 2×4, 1×4, 4×2, 2×2, 1×2, 4×1, 2×1, and 1×1.

Moreover, the OpenEXR format may be used to store additional image metadata. For example, color timing information, process tracking data, or camera position and view direction. OpenEXR can store an arbitrary amount of metadata in the image data.

As described, HDR file formats (e.g., OpenEXR) include a variety of parameters and properties that enable very robust implementations. However, the robustness of the implementations can yield poor conversion results if used by an inexperienced end-user. For example, if the HDR image data contains multiple different channels, it may not be clear which channels to convert to yield the best results. As another example, if the HDR image data contains multiple resolutions of the same image, it may not be well understood which resolution or combination of resolutions yield the best results. In both examples, poorly made decisions can yield very poor results. In some implementations, these decisions can be irreversible because information can be lost during a conversion. For example, because relative colorimetric rendering intents can clip out of gamut colors, some information may be lost when using a relative colorimetric rending intent for conversion.

Referring again to FIGS. 5A, 5B, 5C, and 5D, in some implementations the image data 502 can also include an embedded color profile 504. A color profile defines how color information is transformed into or out of one or more color spaces, and a color profile can conform to a defined color profile architecture (e.g., the International Color Consortium (ICC) color profile architecture). The color profile 504 can include image state information 506. Image state information can specify the type of image data. For example, a scene-referred state indicates that applying the color profile to the image results in scene-referred image data, and an output-referred state indicates that applying the color profile to the image results in output-referred image data. In some implementations, the color profile 504 and the image state information 506 can be separate from the image data 502 and can be associated with the image data 502. Moreover, the image state information 506 can also be separate from both the color profile 504 and the image data 502 and can be associated with the color profile 504.

Figure 5A:
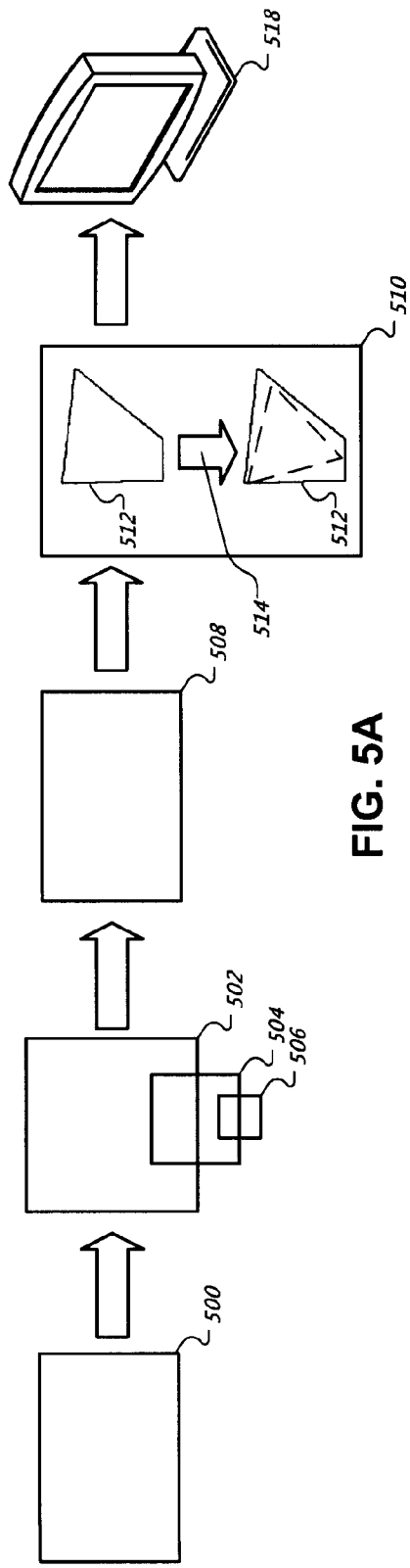
Figure 5B:
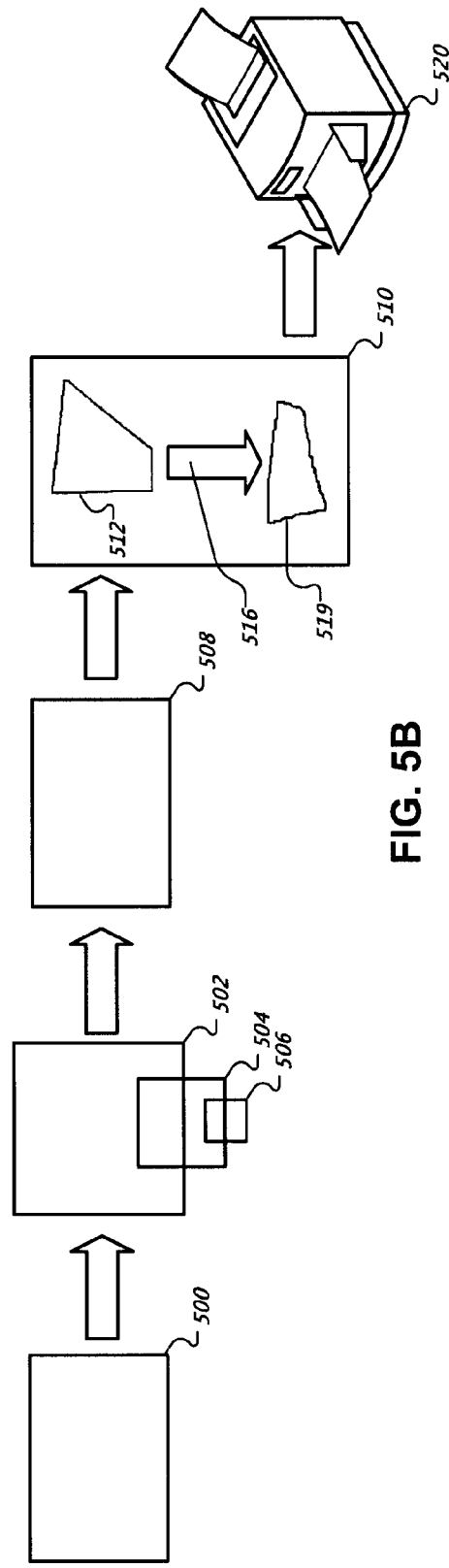

Referring now to FIGS. 5A and 5B, in some implementations, the image data 502 is first automatically transformed to over-range RGB data using the color profile 504, an absolute colorimetric rendering intent, and an RGB profile. For example, CMM 508 can automatically transform colors from an OpenEXR color space into over-range RGB data using an OpenEXR color profile, an absolute colorimetric rendering intent and an RGB profile. Then the over-range RGB data can be automatically transformed to non-over-range RGB data using toning (i.e., tone mapping, as described above).

Referring to FIG. 5A, after the over-range RGB data has been automatically transformed to non-over-range RGB data, the non-over-range RGB data can be transformed to output data using the RGB profile, a display device profile of the display device, and a relative colorimetric rendering intent. For example, CMM 510 can transform non-over-range RGB data 512 into output data for display on the display device 518. The CMM 510 can use the non-over-range RGB data 512, a display device profile 514, and a relative colorimetric rendering intent to generate the output data. As shown, the device profile 514 specifies the transform to the color gamut that the device is capable of displaying. As described previously in reference to FIGS. 3A and 313, the relative colorimetric rending intent compresses the out of gamut colors and substantially maintains the in gamut colors. The automatically transformed data can then be displayed by the display device 518. Example display devices include, but are not limited to, projectors, LCD displays (e.g., monitors or televisions), CRT displays (e.g., monitors or televisions), LED displays (e.g., monitors or televisions), plasma displays, and the like.

Referring now to FIG. 5B, once the over-range RGB image data has been automatically transformed to non-over-range RGB data, the non-over-range RGB data can be automatically transformed to output data using the RGB profile, a printing device profile of the printing device, and a rendering intent based on a preference setting (e.g., a predefined setting). For example, CMM 510 can use non-over-range RGB data 512, a printing device profile 516, and a perceptual or relative colorimetric rending intent to automatically transform the RGB data 512 into CMYK data 519. The preference setting can be defined by the user, or can be an initial configuration of an image processing application, to name two examples.

In some implementations, the CMM used in the previously described operations can be the same, or the CMM can be different (for each of the conversions or for various subsets of the conversions). For example, the CMM (e.g., CMM 508) used to automatically transform the OpenEXR color space to over-range RGB can be the same CMM used to transform the over-range RGB to non-over-range RGB. In addition, the CMM used to automatically transform the over-range RGB to non-over-range RGB can be the same CMM (e.g., CMM 510) used to transform the non-over-range RGB to the output data using the RGB profile.

Referring now to FIGS. 5C and 5D, in some implementations, the current task in the imaging workflow can include displaying a working space image. A CMM 508 can convert image data from the working color space into an XYZ color space. The XYZ color space (i.e., the CIE 1931 or CIE XYZ color space) specifies the colors the human eye is capable of seeing. As such, the XYZ color space is typically used as a basis for other color spaces. However, the XYZ color space is not typically used for output because real devices generally have Gamuts that are a subset of the CIEXYZ space.

Referring now to FIG. 5C, once the colors are converted from the working color space into the XYZ color space, a CMM can convert the colors from the XYZ space to a first display device color space using a first display device profile and a relative colorimetric rendering intent. Additionally, CMM 510 can convert colors between the first display device color space and a second display device color space using a second display device profile and a preview rendering intent defined by a proofing setting (e.g., a relative colorimetric rendering intent). For example, the first display device color space 522 can be the device's entire gamut while the second device color space 524 can be a subset of the device's entire gamut. The image can then be proofed by displaying the automatically converted image on display device 518.

Referring now to FIG. 5D, once the colors are converted between the working color space and XYZ color space, a CMM can convert the colors between the XYZ space and a first printing device color space using a first printing device profile and a rendering intent based on a preference setting (e.g., a predefined setting). For example, the preference setting can specify a relative colorimetric rending intent or a perceptual rendering intent. Additionally, CMM 510 can convert between the printing device color space and a display device color space using a display device profile and a preview rendering intent defined by a proofing setting (e.g., a relative colorimetric rendering intent). For example, the printing device color space 525 can be a CMYK color space, while the display device color space 526 is an RGB color space. The image can then be proofed by printing the automatically converted image on printing device 520, or displaying the automatically converted image on display device 518. In addition, as before, the CMM used in the previously described operations can be the same, or the CMM can be different (for each of the conversions or for various subsets of the conversions).

Figure 6:
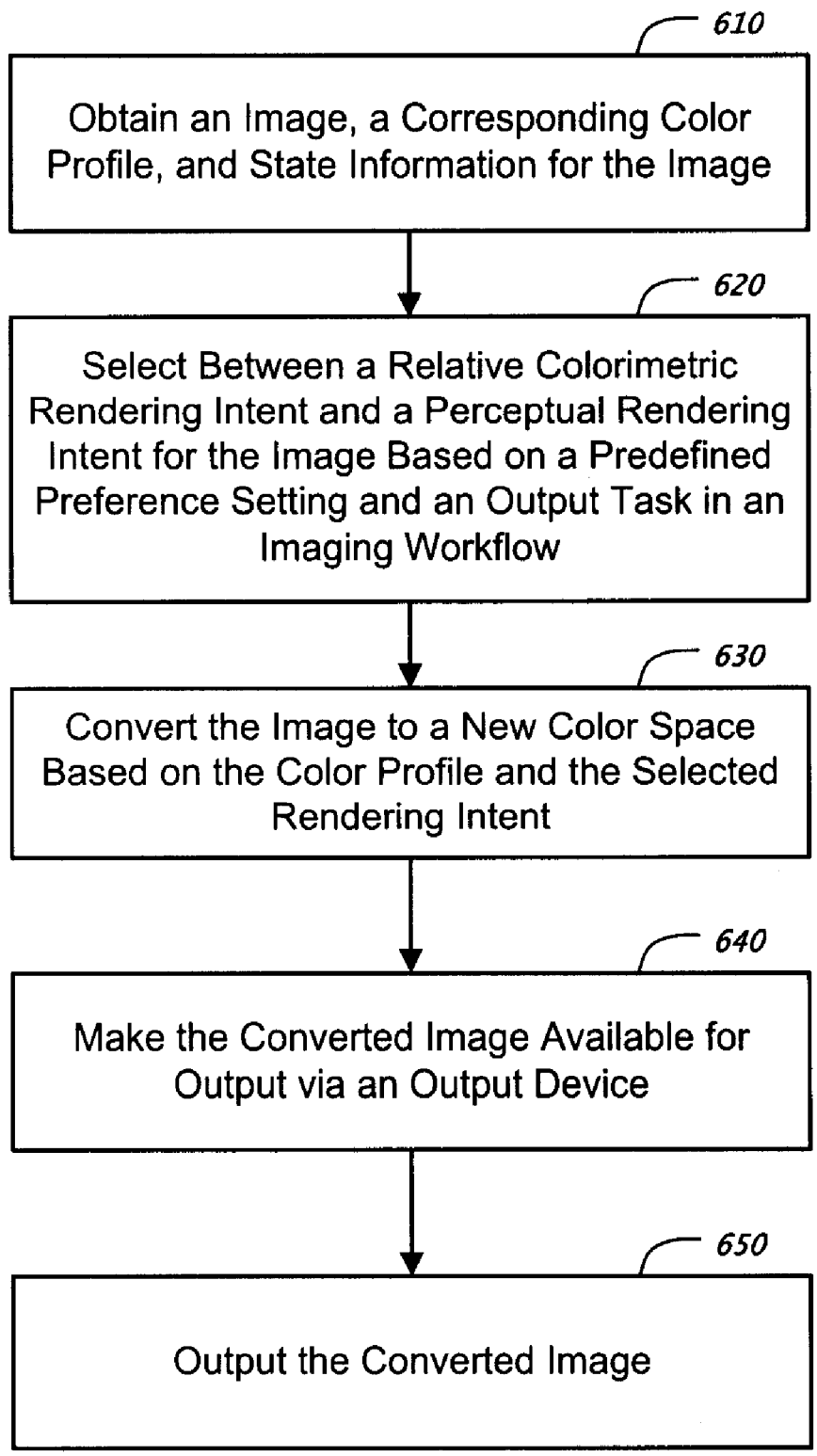
FIG. 6 shows an example process of automatically converting an output-referred image for output.

FIG. 6 shows an example process of automatically converting an output-referred image for output. An image and a corresponding color profile including state information for the image in relation to the color profile are obtained 610. The state information has been selected from a group including a scene-referred state and an output-referred state. As described previously, the scene-referred state indicates that applying the color profile to the image results in scene-referred image data, and the output-referred state indicates that applying the color profile to the image results in output-referred image data. Scene-referred image data is image data that represents estimates of the color-space coordinates of the elements of a scene. Output-referred image data is image data that represents the color-space coordinates of the elements of an image that has undergone color rendering appropriate for a specified real or virtual output device and viewing conditions. In general, scene-referred data is prepared so as to be proportional to relative luminance among objects in a scene depicted in the image, and output-referred data is prepared such that the data is generally non-linear in relation to luminance and facilitates presentation via an output device.

Obtaining the image can involve automatically seeking out and loading the image from a given source, such as a storage medium or a network resource, or receiving the image in response to an event. For example, a user can employ the user interface of an application to locate and direct opening of the image. Moreover, the color profile can be associated with the image and separately loaded along with it, or the color profile can be embedded within the image itself.

In addition, a preference setting can be defined by a user or an application, to name two examples. Furthermore, the application may include initial predefined settings for certain image types, such as JPEG, TIFF, GIF, and the like. Such predefined settings can also be changed by the user of the application. Moreover, the predefined settings can influence the selection of a rendering intent. For example, a check can be made to determine if the color profile includes state information for the image. An additional check can also be made to determine a current task in an imaging workflow. If, for example, the state information indicates an output-referred state and the imaging workflow is performing an image output task to an output device (e.g., output devices described above in reference to FIGS. 5A to 5D), the preference setting(s) can influence an automatic selection 620 between a relative colorimetric rendering intent and a perceptual rendering intent. This selection is automatic in that the selection is performed without user intervention.

Furthermore, in response to the selection of the rendering intent, the image can then be converted 630 automatically to a new color space based on the color profile and the rendering intent, and the converted image can be made available 640 for output via an output device. The new color space generally depends on the workflow and the corresponding output to be expected. For example, if a first output device includes a display which uses a Red-Green-Blue (RGB) color space, the image may be converted to an RGB color space when output to the display. Additionally, if a second output device includes a printer that prints in the Cyan-Magenta-Yellow-Black (CMYK) color space, the image may be converted to a CMYK color space when output to the printer. Moreover, the conversion can be done more than once or between devices. For example, the color space can be converted a first time to RGB for output on the display device, and a second time from RGB to CMYK to output on the printer device. After any further appropriate processing, in view of the current workflow, the converted image can be output 650 to an appropriate output device.

In addition, a preference setting can be implicit in the color profile itself. For example, the color profile can specify one or more rendering intents that can be used, such as the absolute colorimetric rendering intent, the relative colorimetric rendering intent, the perceptual rendering intent, and the saturation rendering intent. If a color profile specifies the perceptual rendering intent (or the saturation rendering intent), but also includes an image state tag indicating scene-referred image data, the image state information is still considered to be output-referred, because the scene-referred interpretation of image data is generally not applicable to the perceptual intent (or the saturation intent).

Figure 7:
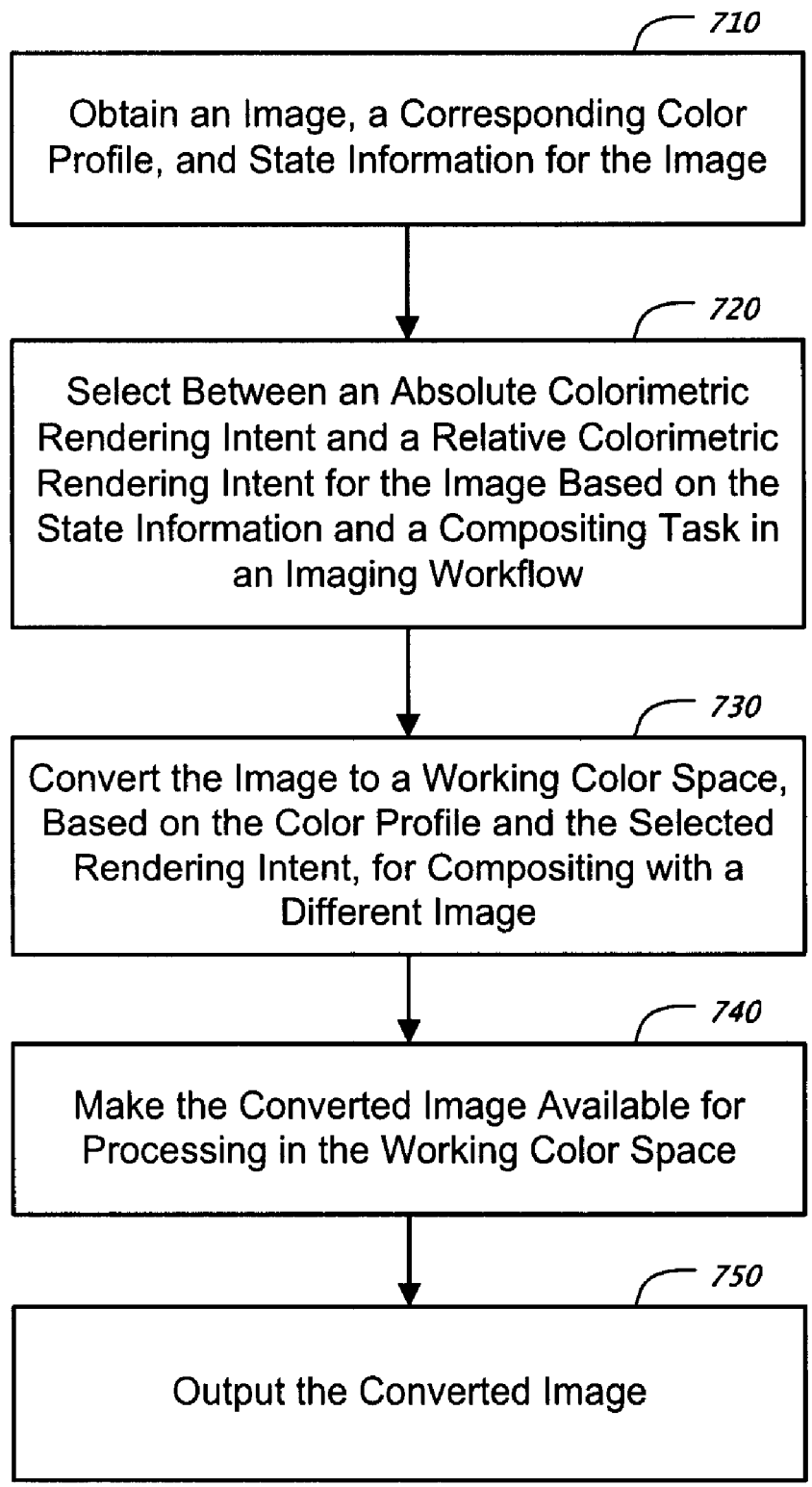
FIG. 7 shows an example process of automatically converting an image for compositing the image with a different image in a working color space.

FIG. 7 shows an example process of automatically converting an image for compositing the image with a different image in a working color space. An image and a corresponding color profile including state information for the image in relation to the color profile are obtained 710. The state information has been selected from a group including a scene-referred state and an output-referred state. As described previously, the scene-referred state indicates that applying the color profile to the image results in scene-referred image data, and the output-referred state indicates that applying the color profile to the image results in output-referred image data. Scene-referred image data is image data that represents estimates of the color-space coordinates of the elements of a scene. Output-referred image data is image data that represents the color-space coordinates of the elements of an image that has undergone color rendering appropriate for a specified real or virtual output device and viewing conditions. In general, scene-referred data is prepared so as to be proportional to relative luminance among objects in a scene depicted in the image, and output-referred data is prepared such that the data is generally non-linear in relation to luminance and facilitates presentation via an output device.

Obtaining the image can involve automatically seeking out and loading the image from a given source, such as a storage medium or a network resource, or receiving the image in response to an event. For example, a user can employ the user interface of an application to locate and direct opening of the image. Moreover, the color profile can be associated with the image and separately loaded along with it, or the color profile can be embedded within the image itself.

Once obtained, a check can be made to determine if the color profile includes state information for the image. An additional check can also be made to determine a current task in an imaging workflow. If, for example, the imaging workflow task is a compositing task using the image and a different image, the state information can be used to automatic select 720 between a relative colorimetric rendering intent and an absolute colorimetric rendering intent. If the state information indicates a scene-referred state, an absolute colorimetric rendering state is selected. Otherwise, if the state information indicates an output-referred state, a relative colorimetric rendering intent is selected. This selection is automatic in that the selection is performed without user intervention. Moreover, if both scene and output data or decoding are available, then in this case, the scene-referred data or decoding can be used.

Furthermore, in response to the selection of the rendering intent, the image can then be converted 730 automatically to a working color space based on the color profile and the rendering intent. A working color space is the color space used by a given application for image processing operations. Working color spaces are often RGB color spaces, such as HDTV (Rec. 709), ProPhoto RGB, Adobe RGB, and sRGB, and a working color space can be an overranged color space (e.g., overranged sRGB). The converted image can be made available 740 for compositing via the imaging compositing workflow task. Compositing can include combining two images (e.g., the image and the different image) into a new image, using parts of each image to create a new image, and the like. One or more additional operations (e.g., the operations described above) can then be used to further process the composite image. For example, once composition is completed, the image can be processed as described by FIG. 6 in order to output the image on an output device. As another example, the composite image can be used as one of the images for another composition process, such as described above. In any event, after any further appropriate processing, in view of the current workflow, the converted image can be output 750 to an appropriate output device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
   obtaining an image, a corresponding color profile and state information for the image, the state information selected from a group including a scene-referred state and an output-referred state, wherein the scene-referred state indicates that applying the color profile to the image results in scene-referred image data;
   selecting, automatically in response to identification of the state information, an absolute colorimetric rendering intent when the state information indicates the scene-referred state and a current task in an imaging workflow comprises outputting the image to an output device;
   converting, automatically in response to the selecting, the image to an output-referred color space based on the color profile and using the absolute colorimetric rendering intent when the state information indicates the scene-referred state and the current task in the imaging workflow comprises outputting the image to the output device; and
   making the converted image available for output via the output device, wherein the output device comprises a display device, and the converting comprises:
   transforming data in the image to over-range RGB data using the color profile, the absolute colorimetric rendering intent, and an RGB profile;
   transforming the over-range RGB data to non-over-range RGB data using toning; and
   transforming the non-over-range RGB data to output data using the RGB profile, a display device profile of the display device, and a relative colorimetric rendering intent.

2. The method of claim 1, wherein the current task in the imaging workflow comprises displaying the image for scene preview.

3. The method of claim 1, wherein the image comprises a working space image, the current task in the imaging workflow comprises displaying the working space image for compositing.

4. The method of claim 1, wherein obtaining the image comprises receiving the image with the color profile embedded therein, the color profile including the state information.

5. A computer-implemented method comprising:
obtaining an image, a corresponding color profile and state information for the image, the state information selected from a group including a scene-referred state and an output-referred state, wherein the scene-referred state indicates that applying the color profile to the image results in scene-referred image data;
selecting, automatically in response to identification of the state information, an absolute colorimetric rendering intent when the state information indicates the scene-referred state and a current task in an imaging workflow comprises outputting the image to an output device;
converting, automatically in response to the selecting, the image to an output-referred color space based on the color profile and using the absolute colorimetric rendering intent when the state information indicates the scene-referred state and the current task in the imaging workflow comprises outputting the image to the output device; and
making the converted image available for output via the output device, wherein the output device comprises a printing device, and the converting comprises:
transforming data in the image to over-range RGB data using the color profile, the absolute colorimetric rendering intent, and an RGB profile;
transforming the over-range RGB data to non-over-range RGB data using toning; and
transforming the non-over-range RGB data to output data using the RGB profile, a printing device profile of the printing device, and an additional rendering intent selected from a group including a relative colorimetric rendering intent and a perceptual rendering intent based on a preference setting.

6. A computer-implemented method comprising:
obtaining an image, a corresponding color profile and state information for the image, the state information selected from a group including a scene-referred state and an output-referred state, wherein the scene-referred state indicates that applying the color profile to the image results in scene-referred image data;
selecting, automatically in response to identification of the state information, an absolute colorimetric rendering intent when the state information indicates the scene-referred state and a current task in an imaging workflow comprises outputting the image to an output device;
converting, automatically in response to the selecting, the image to an output-referred color space based on the color profile and using the absolute colorimetric rendering intent when the state information indicates the scene-referred state and the current task in the imaging workflow comprises outputting the image to the output device; and
making the converted image available for output via the output device, wherein the image comprises a working space image, the current task in the imaging workflow comprises displaying the working space image for display output preview, and the converting comprises:
converting to XYZ space using the color profile and the absolute colorimetric rendering intent;
converting from the XYZ space to a first display device color space using a first display device profile and a relative colorimetric rendering intent; and
converting from the first display device color space to a second display device color space using a second display device profile and a preview rendering intent defined by a proofing setting.

7. A computer-implemented method comprising:
obtaining an image, a corresponding color profile and state information for the image, the state information selected from a group including a scene-referred state and an output-referred state, wherein the scene-referred state indicates that applying the color profile to the image results in scene-referred image data;
selecting, automatically in response to identification of the state information, an absolute colorimetric rendering intent when the state information indicates the scene-referred state and a current task in an imaging workflow comprises outputting the image to an output device;
converting, automatically in response to the selecting, the image to an output-referred color space based on the color profile and using the absolute colorimetric rendering intent when the state information indicates the scene-referred state and the current task in the imaging workflow comprises outputting the image to the output device; and
making the converted image available for output via the output device, wherein the image comprises a working space image, the current task in the imaging workflow comprises displaying the working space image for printing output preview, and the converting comprises:
converting to XYZ space using the color profile and the absolute colorimetric rendering intent;
converting from the XYZ space to a printing device color space using a printing device profile and an additional rendering intent selected from a group including a relative colorimetric rendering intent and a perceptual rendering intent based on a preference setting; and
converting from the printing device color space to a display device color space using a display device profile and a preview rendering intent defined by a proofing setting.

8. A computer program product, encoded on a non-transitory computer-readable medium, operable to cause data processing apparatus to perform operations comprising:
obtaining an image, a corresponding color profile and state information for the image, the state information selected from a group including a scene-referred state and an output-referred state, wherein the scene-referred state indicates that applying the color profile to the image results in scene-referred image data;
selecting, automatically in response to identification of the state information, an absolute colorimetric rendering intent when the state information indicates the scene-referred state and a current task in an imaging workflow comprises outputting the image to an output device;
converting, automatically in response to the selecting, the image to an output-referred color space based on the color profile and using the absolute colorimetric rendering intent when the state information indicates the scene-referred state and the current task in the imaging workflow comprises outputting the image to the output device; and making the converted image available for output via the output device, wherein the output device comprises a display device, and the converting comprises:
  transforming data in the image to over-range RGB data using the color profile, the absolute colorimetric rendering intent, and an RGB profile;
  transforming the over-range RGB data to non-over-range RGB data using toning; and
  transforming the non-over-range RGB data to output data using the RGB profile, a display device profile of the display device, and a relative colorimetric rendering intent.

9. The computer program product of claim 8, wherein the current task in the imaging workflow comprises displaying the image for scene preview.

10. The computer program product of claim 8, wherein the image comprises a working space image, the current task in the imaging workflow comprises displaying the working space image for compositing.

11. The computer program product of claim 8, wherein obtaining the image comprises receiving the image with the color profile embedded therein, the color profile including the state information.

12. A computer program product, encoded on a non-transitory computer-readable medium, operable to cause data processing apparatus to perform operations comprising:
  obtaining an image, a corresponding color profile and state information for the image, the state information selected from a group including a scene-referred state and an output-referred state, wherein the scene-referred state indicates that applying the color profile to the image results in scene-referred image data;
  selecting, automatically in response to identification of the state information, an absolute colorimetric rendering intent when the state information indicates the scene-referred state and a current task in an imaging workflow comprises outputting the image to an output device;
  converting, automatically in response to the selecting, the image to an output-referred color space based on the color profile and using the absolute colorimetric rendering intent when the state information indicates the scene-referred state and the current task in the imaging workflow comprises outputting the image to the output device; and
  making the converted image available for output via the output device, wherein the output device comprises a printing device, and the converting comprises:
    transforming data in the image to over-range RGB data using the color profile, the absolute colorimetric rendering intent, and an RGB profile;
    transforming the over-range RGB data to non-over-range RGB data using toning; and
    transforming the non-over-range RGB data to output data using the RGB profile, a printing device profile of the printing device, and an additional rendering intent selected from a group including a relative colorimetric rendering intent and a perceptual rendering intent based on a preference setting.

13. A computer program product, encoded on a non-transitory computer-readable medium, operable to cause data processing apparatus to perform operations comprising:
  obtaining an image, a corresponding color profile and state information for the image, the state information selected from a group including a scene-referred state and an output-referred state, wherein the scene-referred state indicates that applying the color profile to the image results in scene-referred image data;
  selecting, automatically in response to identification of the state information, an absolute colorimetric rendering intent when the state information indicates the scene-referred state and a current task in an imaging workflow comprises outputting the image to an output device;
  converting, automatically in response to the selecting, the image to an output-referred color space based on the color profile and using the absolute colorimetric rendering intent when the state information indicates the scene-referred state and the current task in the imaging workflow comprises outputting the image to the output device; and
  making the converted image available for output via the output device, wherein the image comprises a working space image, the current task in the imaging workflow comprises displaying the working space image for display output preview, and the converting comprises:
    converting to XYZ space using the color profile and the absolute colorimetric rendering intent;
    converting from the XYZ space to a first display device color space using a first display device profile and a relative colorimetric rendering intent; and
    converting from the first display device color space to a second display device color space using a second display device profile and a preview rendering intent defined by a proofing setting.

14. A computer program product, encoded on a non-transitory computer-readable medium, operable to cause data processing apparatus to perform operations comprising:
  obtaining an image, a corresponding color profile and state information for the image, the state information selected from a group including a scene-referred state and an output-referred state, wherein the scene-referred state indicates that applying the color profile to the image results in scene-referred image data;
  selecting, automatically in response to identification of the state information, an absolute colorimetric rendering intent when the state information indicates the scene-referred state and a current task in an imaging workflow comprises outputting the image to an output device;
  converting, automatically in response to the selecting, the image to an output-referred color space based on the color profile and using the absolute colorimetric rendering intent when the state information indicates the scene-referred state and the current task in the imaging workflow comprises outputting the image to the output device; and
  making the converted image available for output via the output device, wherein the image comprises a working space image, the current task in the imaging workflow comprises displaying the working space image for printing output preview, and the converting comprises:
    converting to XYZ space using the color profile and the absolute colorimetric rendering intent;
    converting from the XYZ space to a printing device color space using a printing device profile and an additional rendering intent selected from a group including a relative colorimetric rendering intent and a perceptual rendering intent based on a preference setting; and
    converting from the printing device color space to a display device color space using a display device profile and a preview rendering intent defined by a proofing setting.

15. A system comprising:
an output device; and
one or more computers operable to interact with the output device and to perform operations comprising:
- obtaining an image, a corresponding color profile and state information for the image, the state information selected from a group including a scene-referred state and an output-referred state, wherein the scene-referred state indicates that applying the color profile to the image results in scene-referred image data;
- selecting, automatically in response to identification of the state information, an absolute colorimetric rendering intent when the state information indicates the scene-referred state and a current task in an imaging workflow comprises outputting the image to the output device;
- converting, automatically in response to the selecting, the image to the output-referred color space based on the color profile and using the absolute colorimetric rendering intent when the state information indicates the scene-referred state and the current task in the imaging workflow comprises outputting the image to the output device; and
- making the converted image available for output via the output device, wherein the output device comprises a display device, and the converting comprises:
  - transforming data in the image to over-range RGB data using the color profile, the absolute colorimetric rendering intent, and an RGB profile;
  - transforming the over-range RGB data to non-over-range RGB data using toning; and
  - transforming the non-over-range RGB data to output data using the RGB profile, a display device profile of the display device, and a relative colorimetric rendering intent.

16. The system of claim 15, wherein the current task in the imaging workflow comprises displaying the image for scene preview.

17. The system of claim 15, wherein the image comprises a working space image, the current task in the imaging workflow comprises displaying the working space image for compositing.

18. The system of claim 15, wherein obtaining the image comprises receiving the image with the color profile embedded therein, the color profile including the state information.

19. The system of claim 15, wherein the one or more computers comprise a server operable to interact with the output device through a data communication network, and the output device is operable to interact with the server as a client.

20. The system of claim 15, wherein the one or more computers comprise one personal computer, and the personal computer comprises the output device.

21. A system comprising:
an output device; and
one or more computers operable to interact with the output device and to perform operations comprising:
- obtaining an image, a corresponding color profile and state information for the image, the state information selected from a group including a scene-referred state and an output-referred state, wherein the scene-referred state indicates that applying the color profile to the image results in scene-referred image data;
- selecting, automatically in response to identification of the state information, an absolute colorimetric rendering intent when the state information indicates the scene-referred state and a current task in an imaging workflow comprises outputting the image to the output device;
- converting, automatically in response to the selecting, the image to the output-referred color space based on the color profile and using the absolute colorimetric rendering intent when the state information indicates the scene-referred state and the current task in the imaging workflow comprises outputting the image to the output device; and
- making the converted image available for output via the output device, wherein the output device comprises a printing device, and the converting comprises:
  - transforming data in the image to over-range RGB data using the color profile, the absolute colorimetric rendering intent, and an RGB profile;
  - transforming the over-range RGB data to non-over-range RGB data using toning; and
  - transforming the non-over-range RGB data to output data using the RGB profile, a printing device profile of the printing device, and an additional rendering intent selected from a group including a relative colorimetric rendering intent and a perceptual rendering intent based on a preference setting.

22. A system comprising:
an output device; and
one or more computers operable to interact with the output device and to perform operations comprising:
- obtaining an image, a corresponding color profile and state information for the image, the state information selected from a group including a scene-referred state and an output-referred state, wherein the scene-referred state indicates that applying the color profile to the image results in scene-referred image data;
- selecting, automatically in response to identification of the state information, an absolute colorimetric rendering intent when the state information indicates the scene-referred state and a current task in an imaging workflow comprises outputting the image to the output device;
- converting, automatically in response to the selecting, the image to the output-referred color space based on the color profile and using the absolute colorimetric rendering intent when the state information indicates the scene-referred state and the current task in the imaging workflow comprises outputting the image to the output device; and
- making the converted image available for output via the output device, wherein the image comprises a working space image, the current task in the imaging workflow comprises displaying the working space image for display output preview, and the converting comprises:
  - converting to XYZ space using the color profile and the absolute colorimetric rendering intent;
  - converting from the XYZ space to a first display device color space using a first display device profile and a relative colorimetric rendering intent; and
  - converting from the first display device color space to a second display device color space using a second display device profile and a preview rendering intent defined by a proofing setting.

23. A system comprising:

an output device; and one or more computers operable to interact with the output device and to perform operations comprising:

obtaining an image, a corresponding color profile and state information for the image, the state information selected from a group including a scene-referred state and an output-referred state, wherein the scene-referred state indicates that applying the color profile to the image results in scene-referred image data;

selecting, automatically in response to identification of the state information, an absolute colorimetric rendering intent when the state information indicates the scene-referred state and a current task in an imaging workflow comprises outputting the image to the output device;

converting, automatically in response to the selecting, the image to the output-referred color space based on the color profile and using the absolute colorimetric rendering intent when the state information indicates the scene-referred state and the current task in the imaging workflow comprises outputting the image to the output device; and making the converted image available for output via the output device, wherein the image comprises a working space image, the current task in the imaging workflow comprises displaying the working space image for printing output preview, and the converting comprises:

converting to XYZ space using the color profile and the absolute colorimetric rendering intent;

converting from the XYZ space to a printing device color space using a printing device profile and an additional rendering intent selected from a group including a relative colorimetric rendering intent and a perceptual rendering intent based on a preference setting; and converting from the printing device color space to a display device color space using a display device profile and a preview rendering intent defined by a proofing setting.

* * * * *